(12) United States Patent
Harmeyer et al.

(10) Patent No.: US 11,796,063 B2
(45) Date of Patent: Oct. 24, 2023

(54) SEAL ASSEMBLY FOR ROTATABLE SHAFT HAVING VENTILATED DUST SEAL WITH DEBRIS-BLOCKING FILTER

(71) Applicant: Caterpillar Inc., Peoria, IL (US)

(72) Inventors: Keith Joseph Harmeyer, Lafayette, IN (US); Elmer S. Zanoria, Dunlap, IL (US); Daniel Joshua Smith, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 17/332,797

(22) Filed: May 27, 2021

(65) Prior Publication Data

US 2022/0381347 A1    Dec. 1, 2022

(51) Int. Cl.
| | | |
|---|---|---|
| *F16J 15/32* | (2016.01) |
| *F16J 15/3228* | (2016.01) |
| *F16J 15/3248* | (2016.01) |
| *F16J 15/34* | (2006.01) |

(52) U.S. Cl.
CPC ....... *F16J 15/3228* (2013.01); *F16J 15/3248* (2013.01); *F16J 15/348* (2013.01)

(58) Field of Classification Search
CPC ..... F16J 15/3228; F16J 15/3248; F16J 15/348
See application file for complete search history.

(56) References Cited

U.S. PATENT DOCUMENTS

| | | | | |
|---|---|---|---|---|
| 3,572,732 A | * | 3/1971 | Sekulich | F16J 15/3244 277/553 |
| 3,771,799 A | * | 11/1973 | Sekulich | F16J 15/3456 277/386 |
| 3,917,286 A | | 11/1975 | Loyd | |
| 3,955,859 A | * | 5/1976 | Stella | F16J 15/3232 277/567 |
| 4,531,747 A | * | 7/1985 | Miura | F16J 15/3232 277/552 |
| 4,667,968 A | * | 5/1987 | Nash | F16J 15/3264 277/552 |
| 5,209,502 A | * | 5/1993 | Savoia | F16J 15/3228 277/575 |

(Continued)

FOREIGN PATENT DOCUMENTS

| | | |
|---|---|---|
| CN | 205918897 U | 2/2017 |
| CN | 107725783 A | 2/2018 |

(Continued)

*Primary Examiner* — Vishal A Patel
(74) *Attorney, Agent, or Firm* — Brannon Sowers & Cracraft PC

(57) ABSTRACT

A seal assembly for a rotatable shaft assembly includes a seal housing and each of a main seal and a dust seal extending circumferentially around a seal housing center axis. The dust seal includes a radially inward dust seal lip, and is formed by a sealing layer having a plurality of ventilation openings formed therein, and a debris-blocking filter layer attached to the sealing layer and positioned across the ventilation openings. The main seal and dust seal assist in maintaining lubricating oil within a seal cavity. The dust seal prevents entry of debris whilst ventilating the seal cavity to limit carbonization of oil on seal assembly components. In an implementation the seal assembly is part of a rotatable crankshaft assembly.

20 Claims, 4 Drawing Sheets

(56) References Cited

U.S. PATENT DOCUMENTS

| | | | |
|---|---|---|---|
| 6,257,587 B1* | 7/2001 | Toth | F16J 15/3256 |
| | | | 277/566 |
| 8,042,814 B2* | 10/2011 | Walter | F16C 33/7876 |
| | | | 277/552 |
| 8,955,849 B2 | 2/2015 | Sedlar | |
| 9,927,031 B2 | 3/2018 | Omoto et al. | |
| 10,520,036 B2* | 12/2019 | Ishida | F16C 33/7823 |
| 2016/0003359 A1* | 1/2016 | Iwakata | F16J 15/3252 |
| | | | 277/552 |
| 2016/0116065 A1* | 4/2016 | Putkowski | F16J 15/164 |
| | | | 277/550 |

FOREIGN PATENT DOCUMENTS

| | | |
|---|---|---|
| GB | 9927031 B | 1/2021 |
| JP | 2007225063 A | 9/2007 |

\* cited by examiner

SEAL ASSEMBLY FOR ROTATABLE SHAFT HAVING VENTILATED DUST SEAL WITH DEBRIS-BLOCKING FILTER

TECHNICAL FIELD

The present disclosure relates generally to a rotatable shaft assembly in a machine system, and more particularly to a seal assembly having a main seal and a ventilated dust seal.

BACKGROUND

Many rotatable shaft mechanisms in machinery such as an engine crankshaft in an engine employ shaft seals to maintain a lubricating oil within the machinery and upon surfaces of rotating components. In an engine crankshaft it is common to employ a front crankshaft seal and a back crankshaft seal. Such seals are commonly installed into the cylinder block such as by press-fitting to form a static seal with the cylinder block, and a dynamic seal about the rotating crankshaft.

The dynamic seal portion in such examples typically includes a non-metallic material such as a polytetrafluoroethylene (PTFE) material that contacts an outer rotating surface of the crankshaft or a wear sleeve or the like fitted thereon. Oil within the engine crankcase can migrate between the dynamic seal portions and the crankshaft itself to some degree, assisting in lubrication of the interfacing surfaces.

Such seals commonly also include a dust seal positioned outwardly of a main seal to prevent introduction of debris from the environment. The closed environment between the dust seal and main seal can sometimes create conditions resulting in less than optimal seal performance, leading to premature wear of seal components or other issues. One known lip seal assembly for a crankshaft is set forth in U.S. Pat. No. 3,917,286 to Loyd. In the concept set forth in Loyd a metal case lip seal is detachably mounted in a bore of an engine block and includes a flexible annular lip of a sealing element that sealingly contacts a crankshaft. Loyd's seal construction apparently provides a first annular portion that engages the block and a second annular portion connected to the first at a reverse bend. The second annular portion pilots the lip seal in the bore and permits limited radial movement thereof during crankshaft operation.

SUMMARY OF THE INVENTION

In one aspect, a rotatable shaft assembly includes a rotatable shaft having a shaft axis of rotation. A seal assembly is upon the rotatable shaft and includes a seal housing, a main seal, and a dust seal, each extending circumferentially around the shaft axis of rotation. The main seal includes a radially outward mounting portion coupled to the seal housing, and a radially inward main seal lip. The main seal is deformed between the seal housing and the rotatable shaft and curved in axial profile, such that the radially inward main seal lip is positioned to seal about the rotatable shaft at a first axial location spaced from the radially outward mounting portion. The dust seal includes a radially outward mounting portion coupled to the seal housing, and a radially inward dust seal lip positioned to seal about the rotatable shaft at a second axial location. The dust seal further includes a sealing layer forming the radially inward dust seal lip and having a ventilation opening formed therein, and a debris-blocking filter layer attached to the sealing layer and positioned across the ventilation opening.

In another aspect, a rotatable shaft seal assembly includes a seal housing defining a center axis, and a main seal extending circumferentially around the center axis and including a mounting portion coupled to the seal housing, and a main seal lip. The seal assembly further includes a dust seal extending circumferentially around the center axis and having a mounting portion coupled to the seal housing, and a dust seal lip. The dust seal further includes a sealing layer forming the dust seal lip and having a ventilation opening formed therein, and a debris-blocking filter layer attached to the sealing layer and positioned across the ventilation opening.

In still another aspect, a seal assembly includes a seal housing defining a center axis, and a main seal extending circumferentially around the center axis and having a mounting portion coupled to the seal housing, and a main seal lip. The seal assembly further includes a dust seal extending circumferentially around the center axis and having a mounting portion coupled to the seal housing, a dust seal lip, an inner surface, and an outer surface. The dust seal further has formed therein a ventilation opening communicating between the inner surface and the outer surface, and includes a debris-blocking filter positioned across the ventilation opening.

DETAILED DESCRIPTION

Figure 1:
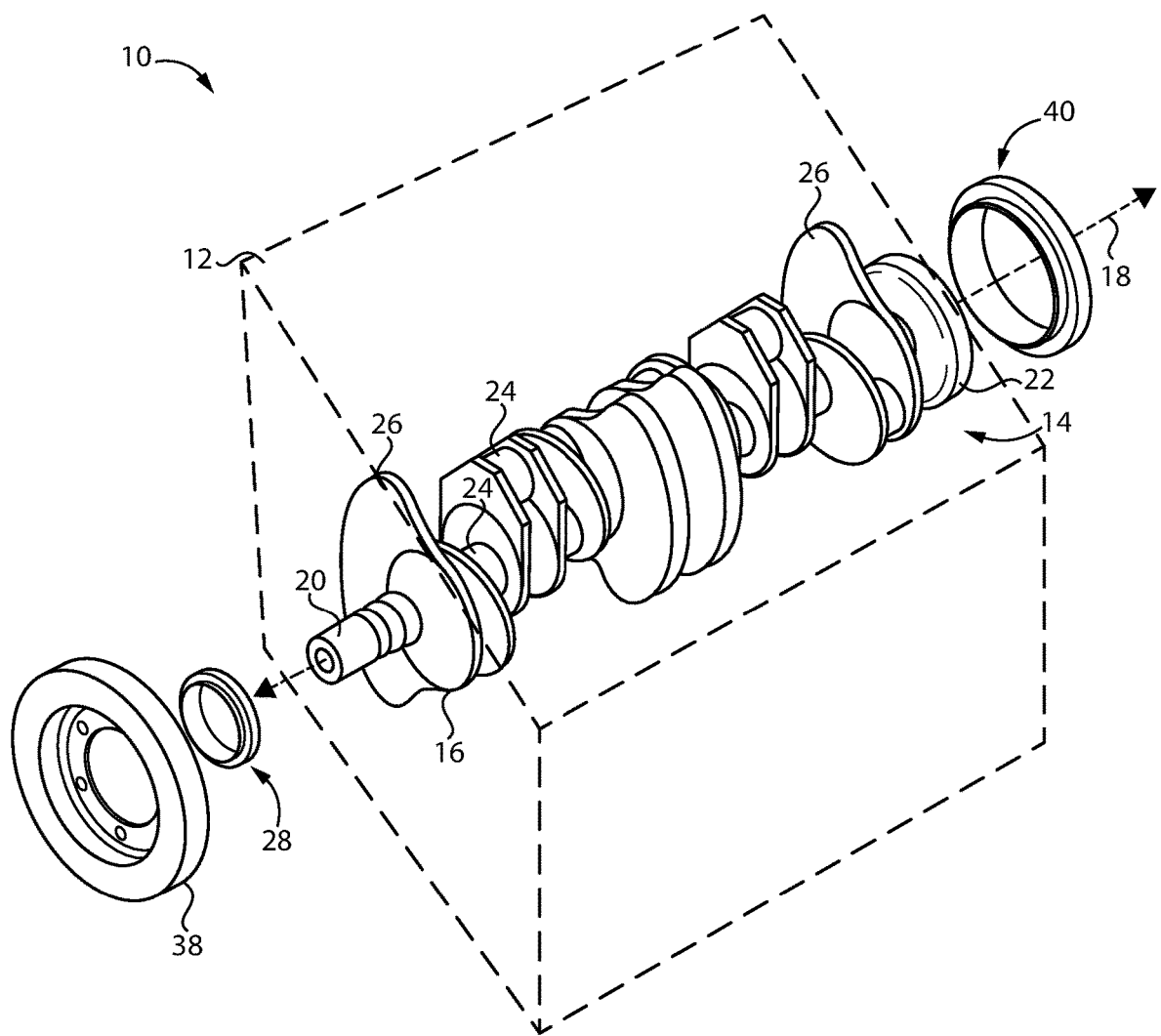
FIG. 1 is a diagrammatic view of a machine system, according to one embodiment.
Figure 2:
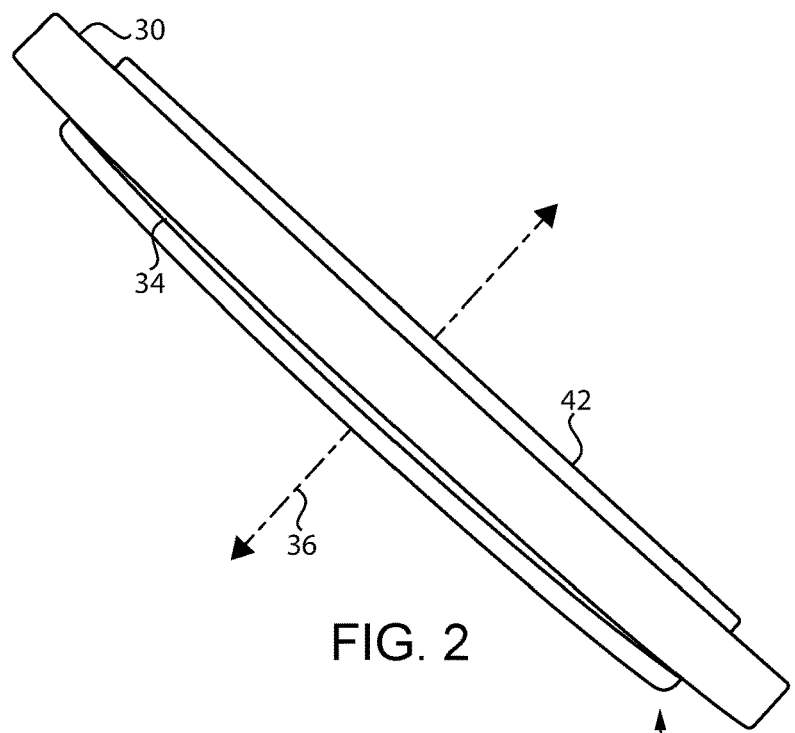
FIG. 2 is an elevational view of a seal assembly, according to one embodiment.
Figure 3:
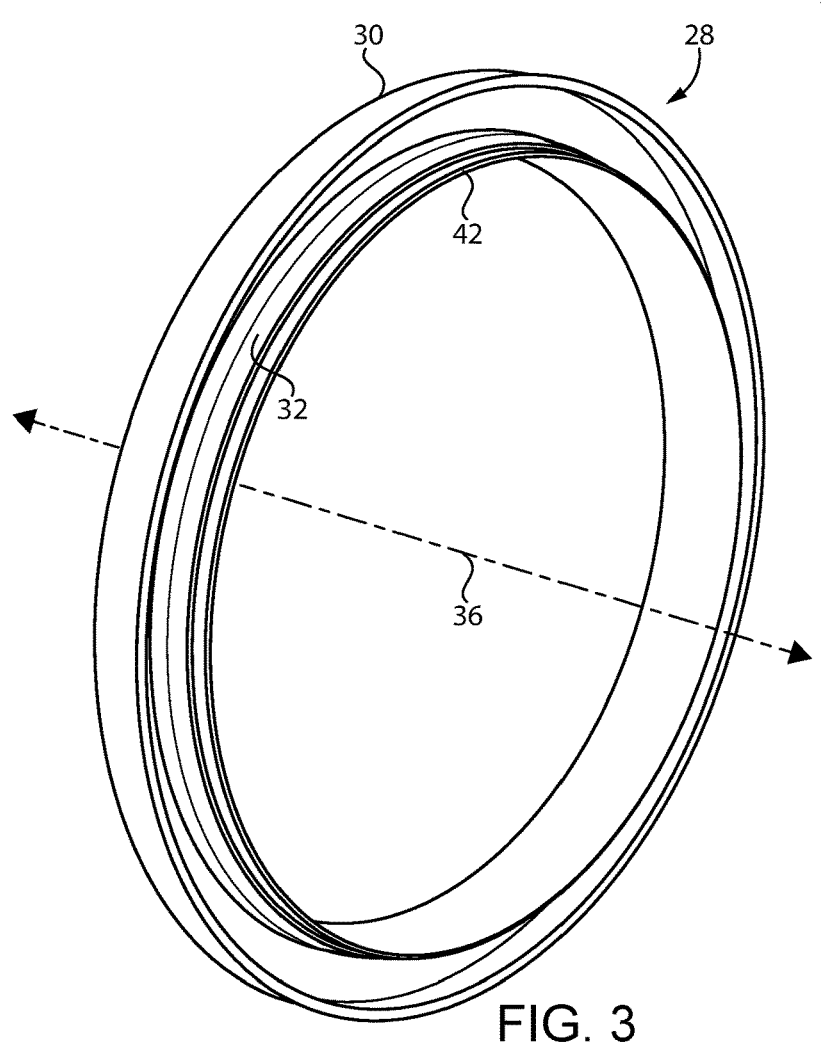
FIG. 3 is a diagrammatic view of a seal assembly, as in FIG. 2.
Figure 4:
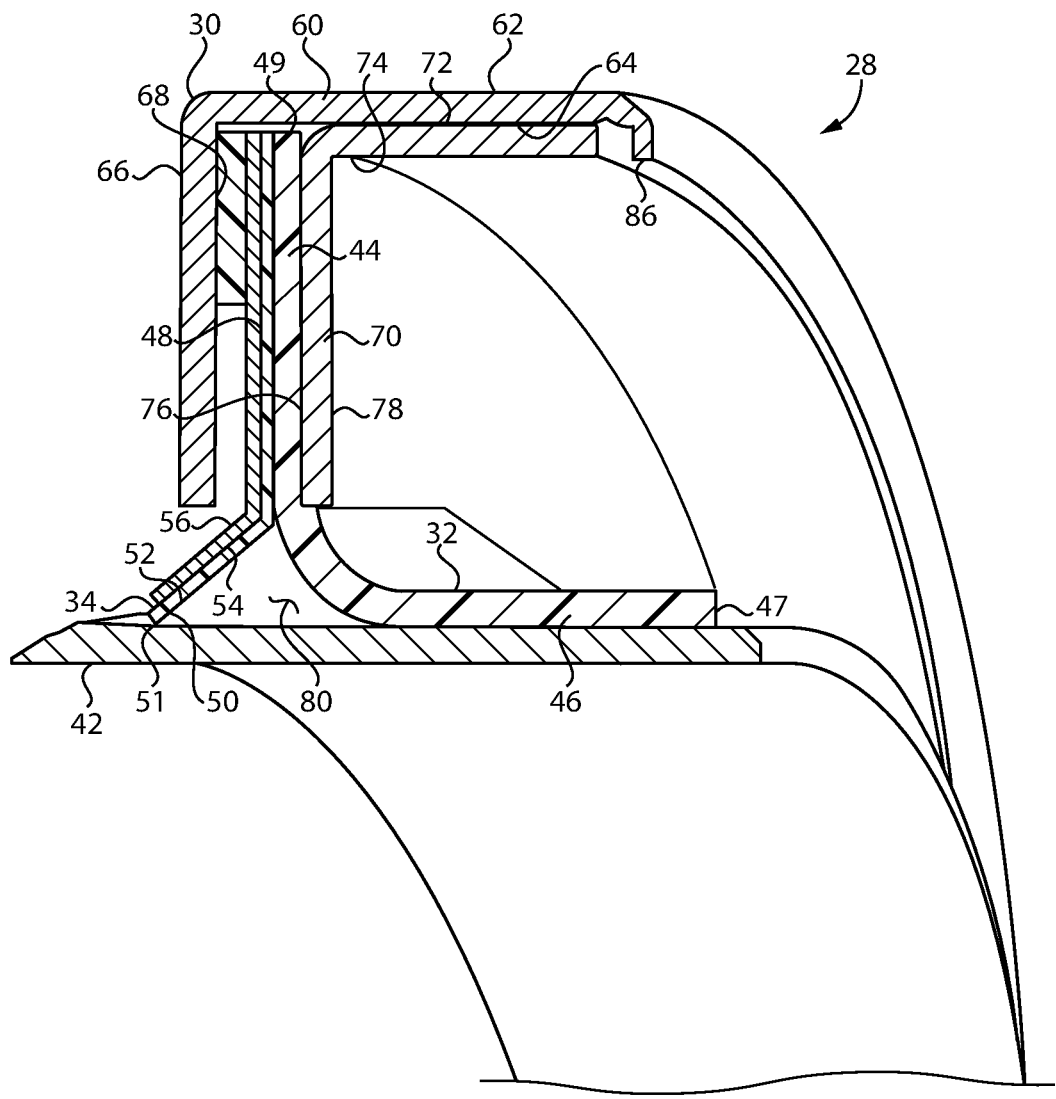
FIG. 4 is a sectioned view, in perspective, of a seal assembly as in FIGS. 2 and 3.
Figure 5:
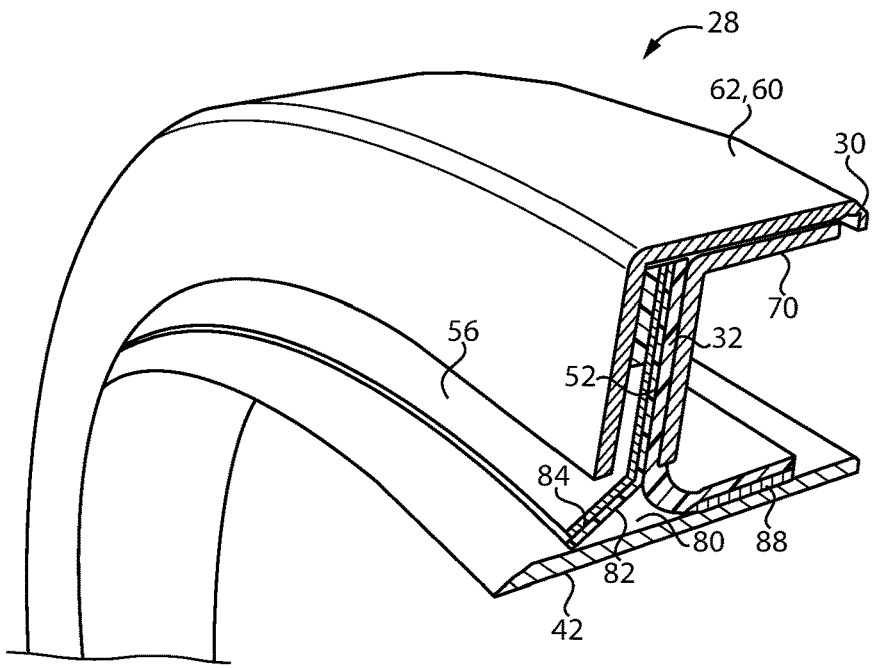
FIG. 5 is another sectioned view, in perspective, of a seal assembly as in FIGS. 2-4.
Figure 6:
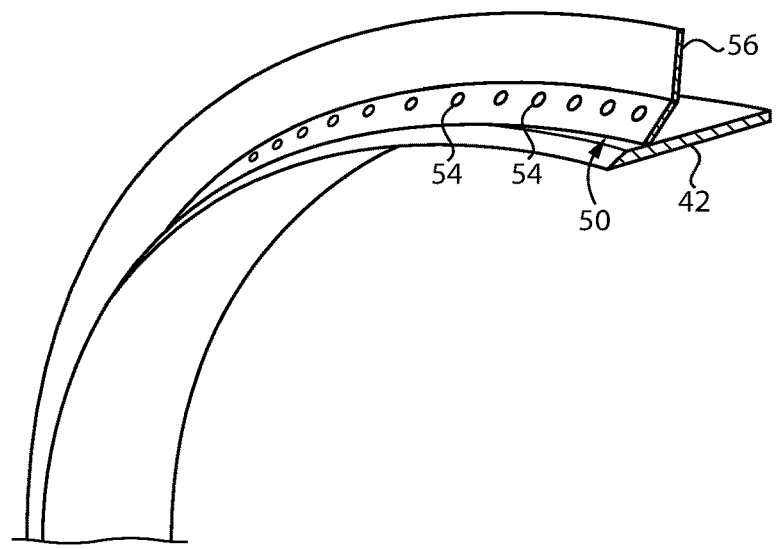
FIG. 6 is a sectioned view, in perspective, of a portion of a seal assembly as in FIGS. 2-5.

Referring to FIG. 1 there is shown a machine system 10, according to one embodiment. Machine system 10 includes a housing 12, and a rotatable shaft assembly 14 structured to be supported for rotation in housing 12. Machine system 10 may include an internal combustion engine system, such as a diesel engine system. Rotatable shaft assembly 14 includes a rotatable shaft 16 defining a shaft axis of rotation 18 extending between a first axial end 20 and a second axial end 22. In the illustrated embodiment rotatable shaft 16 includes an engine crankshaft, including crank pins 24 and balance weights 26 in a generally conventional manner. It will thus be appreciated that rotatable shaft assembly 14 rotates in housing 12 during service to convert linear movement of pistons to torque for any of a great variety of known applications. Rotatable shaft 16 may be equipped with bearing surfaces and supported for rotation with bearing caps or the like according to any suitable construction.

Rotatable shaft assembly 14 further includes a first seal assembly 28 positionable upon rotatable shaft 16 at first axial end 20, and a second seal assembly 40 positionable upon rotatable shaft 16 at second axial end 22. First seal assembly 28 and second seal assembly 40 may be of identical, similar, or different configurations. As illustrated first seal assembly 28 includes a front crankshaft seal and second seal assembly 40 includes a back crankshaft seal larger than the front crankshaft seal. Discussion and description herein of seal assembly 28 should be understood to refer by way of analogy to features of seal assembly 40 as well as to any of the other various embodiments contemplated herein. A torsional damper 38 may be coupled to first axial end 20 of rotatable shaft 16 adjacent to seal assembly 28. As will be further apparent from the following description, seal assembly 28 is uniquely structured for lubrication and sealing about rotatable shaft 16 and exclusion of debris.

Referring also now to FIGS. 2-6, seal assembly 28 includes a seal housing 30, a main seal 32, and a dust seal 34. Each of seal housing 30, main seal 32, and dust seal 34 extends circumferentially around shaft axis of rotation 18. Seal housing 30 can further be understood to define a seal center axis 36, with each of seal housing 30, main seal 32, and dust seal 34 extending circumferentially around seal center axis 36. In an implementation, seal housing 30 is formed of a metallic material, such as steel. Main seal 32 may be formed of a polymeric material such as a PTFE material. Dust seal 34 may have a layered structure in some embodiments with the layers formed of non-metallic materials, as further discussed herein.

Main seal 32 includes a radially outward mounting portion 44 coupled to seal housing 30, and a radially inward main seal lip 46. Main seal lip 46 can be thickened relative to other parts of main seal 32 in some embodiments although the present disclosure is not thereby limited. Radially inward main seal lip 46 may also form a terminal end or inner peripheral edge 47 of main seal 32. Radially outward mounting portion 44 may form an outer peripheral edge 49 of main seal 32. Main seal 32 is deformed between seal housing 30 and rotatable shaft 16 and is curved in axial profile, such that radially inward main seal lip 46 is positioned to seal about rotatable shaft 16 at a first axial location spaced from radially outward mounting portion 44. In some embodiments a main seal might have an alternative configuration where a main seal lip is radially outward and a mounting portion is radially inward. Main seal 32 may have at least some internal elastic resiliency, such that when unbiased main seal 32 has a tendency to assume a form closer to planar than what is depicted in the drawings. Deformation of main seal 32 against an internal bias can assist in maintaining a radially inward squeeze about rotatable shaft 16.

In the illustrated embodiment a wear sleeve 42 extends through seal assembly 28 and is positioned radially between main seal 32 and rotatable shaft 16 and radially between dust seal 34 and rotatable shaft 16. Wear sleeve 42 can be formed of a suitable metallic material, such as steel, and is interference-fitted upon rotatable shaft 16. Seal housing 30 may be interference-fitted within housing 12, such as a cylinder block, in machine system 10. A static seal may thus be formed between seal housing 30 and housing 12, and a dynamic seal formed between main seal 32 and wear sleeve 42, which rotates with rotatable shaft 16. Wear sleeve 42 may form an assembly with other components of seal assembly 28 and can be sold as such an assembly. In other embodiments, a wear sleeve might be provided separately or not be used at all.

As noted above, main seal 32 is curved in axial profile, relative to seal center axis 36 and shaft axis of rotation 18, which may be colinear. "Axial" refers to directions along axes 36 and 18, and "radial" refers to directions normal to axes 36 and 18. In the illustrated embodiment main seal 32 is deformed between seal housing 30 and rotatable shaft 16 so as to project from seal housing 30 in a first axial direction. Dust seal 34 may be deformed between seal housing 30 and rotatable shaft 16 so as to project from seal housing 30 in a second axial direction opposite to the first axial direction.

Dust seal 34 includes a radially outward mounting portion 48 coupled to seal housing 30, and a radially inward dust seal lip 50 positioned to seal about rotatable shaft 16 at a second axial location. It can thus be seen that a spacing distance extends axially between sealing locations of radially inward main seal lip 46 and radially inward dust seal lip 50. It can also be seen that a circumferential seal cavity 80 extends between main seal 32, dust seal 34, and rotatable shaft 16, in particular being defined by main seal 32, dust seal 34, and wear sleeve 42 in the illustrated embodiment. In some embodiments a dust seal could have an alternative configuration where a dust seal lip is radially outward and a mounting portion is radially inward.

Also in the illustrated embodiment, seal housing 30 includes an outer housing piece 60 and an inner housing piece 70 mated with outer housing piece 60. Outer housing piece 60 forms an L-shape in cross-section and includes a cylindrical outer surface 62, a cylindrical inner surface 64, an outside axial surface 66, and an inside axial surface 68. Inner housing piece 70 forms an L-shape in cross-section and includes a cylindrical outer surface 72, a cylindrical inner surface 74, an outside axial surface 76, and an inside axial surface 78. Cylindrical inner surface 64 of outer housing piece 60 may be interference-fitted with cylindrical outer surface 72 of inner housing piece 70. Main seal 32 and dust seal 34 may be clamped between inside axial surface 68 of outer housing piece 60 and outside axial surface 76 of inner housing piece 70. It can also be seen from the drawings that radially outward mounting portion 44 of main seal 32 and radially outward mounting portion 48 of dust seal 34 extend between outer piece 60 and inner housing piece 70, and may be clamped together between outer housing piece 60 and inner housing piece 70. Outer housing piece 60 may include a circumferential lip, flange, or other structure 86 that extends radially inward, for instance being bent inward during assembly, and can inhibit disassembly of outer housing piece 60 and inner housing piece 70 if the interference fit between them is reversed or disturbed.

As noted above, dust seal 34 can include different materials and in some embodiments is a layered structure. Dust seal 34 may include a sealing layer 52 forming radially inward dust seal lip 50. Sealing layer 52 may be formed of a suitable polymeric material, including a suitable PTFE material similar to the material of main seal 32. Dust seal 34 further includes a ventilation opening 54 formed therein, and a debris-blocking filter layer 56 attached to sealing layer 52 and positioned across ventilation opening 54. In an embodiment, ventilation opening 54 is one of a plurality of through-holes 54. With focus on FIG. 6, there it can be seen that ventilation openings 54 have a circumferential distribution and are spaced radially outward of radially inward dust seal lip 50. Debris-blocking filter layer 56 or "filter 56" may be continuous in extent circumferentially around seal center axis 36. Also in the illustrated embodiment sealing layer 52 includes an inner surface 82 exposed to circumferential seal cavity 80, and an outer surface 84. Ventilation openings 54 communicate between inner surface 82 and outer surface 84. As illustrated, debris-blocking filter layer 56 is attached to outer surface 84, which is positioned opposite to circumferential seal cavity 80.

Debris-blocking filter layer 56 can include a textile material, such as a woven material or a non-woven material. In an embodiment, debris-blocking filter layer 56 is formed of a felt material, thus forming a felt filter layer. Debris-blocking filter layer 56 may be attached to sealing layer 52 such as by way of an adhesive. In other embodiments, debris-blocking filter layer 56 could be attached to inner surface 82 and thus exposed directly to circumferential seal cavity 80. Thus, a debris-blocking filter is attached to at least one of inner surface 82 or outer surface 84. It can further be noted that both sealing layer 52 and debris-blocking filter layer 56 may form radially outward mounting portion 48 of dust seal 34. Main seal 32, sealing layer 52, and debris-blocking filter layer 56 may all be clamped together between outer housing piece 60 and inner housing piece 70 with sealing layer 52 and debris-blocking filter layer 56 being sandwiched between main seal 32 and outer housing piece 60. Sealing layer 52 may be sandwiched between debris-blocking filter layer and main seal 32 as illustrated. In an embodiment where debris-blocking filter layer 56 is attached to inner surface 82 debris-blocking filter layer 56 could be understood to be sandwiched between main seal 32 and sealing layer 52. It can also be noted from the drawings that debris-blocking filter layer 56 extends peripherally outward towards an inner peripheral edge 51 of sealing layer 52 but stands back slightly from inner peripheral edge 51 such that material of debris-blocking filter layer 56 does not typically contact rotating wear sleeve 42 during service.

INDUSTRIAL APPLICABILITY

When seal assembly 28 is installed for service in machine system 10 wear sleeve 42 can be interference-fitted upon rotatable shaft 16, and seal housing 30 interference-fitted with housing 12, directly with a cylinder block or with an insert within a cylinder block, for example. When rotatable shaft 16 is rotated main seal 32 rides in rotating contact with wear sleeve 42 at the first axial location, and dust seal 34 rides in rotating contact with wear sleeve 42 at the second axial location. With focus on FIG. 5, there can be seen a groove 88 formed in main seal 32. Groove 88 may be one of a plurality of angular grooves circumferentially around main seal 32, typically formed at an angular offset to seal center axis 36 and extending between circumferential seal cavity 80 and a crankcase or other oil cavity or conduit in machine system 10. Based on the angular orientation and fluid connections provided by grooves 88 a pumping action of oil between wear sleeve 42 and main seal 32, and into circumferential seal cavity 80, can be realized.

Certain known seal assemblies are unventilated, meaning that a circumferential seal cavity may fluidly connect to an oil supply but not have a direct outlet or return. As a result, during service oil flow and migration to or from the seal cavity can be relatively limited, sometimes resulting in temperatures high enough to cause carbonization of oil. The carbonization of oil can result in carbonized deposits in grooves in a main seal. Deposits in such grooves can cause blockage or other performance degradation. Some seals may experience pressure fluctuations within a seal cavity or other phenomena that force oil out of the seal assembly. According to the present disclosure, ventilation openings 54 can assist in mitigating temperature and pressure fluctuations and/or extremes in seal assembly 28, while the risk of debris intrusion in mitigated by debris-blocking filter layer 56.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure.

Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A rotatable shaft assembly comprising:
a rotatable shaft defining a shaft axis of rotation;
a seal assembly upon the rotatable shaft and including a seal housing, a main seal, and a dust seal, each extending circumferentially around the shaft axis of rotation;
the main seal including a radially outward mounting portion coupled to the seal housing, and a radially inward main seal lip;
the main seal is deformed between the seal housing and the rotatable shaft and curved in axial profile, such that the radially inward main seal lip is positioned to seal about the rotatable shaft at a first axial location spaced from the radially outward mounting portion;
the dust seal including a radially outward mounting portion coupled to the seal housing, and a radially inward dust seal lip positioned to seal about the rotatable shaft at a second axial location;
the dust seal further including a sealing layer forming the radially inward dust seal lip and having a ventilation opening formed therein, and a debris-blocking filter layer attached to the sealing layer and positioned across the ventilation opening;
a seal cavity formed inside the seal assembly extends axially from the dust seal to the main seal, and the dust seal further including a dust seal outside surface that is exposed outside of the seal assembly;
the seal housing including a first housing piece and a second housing piece, and the radially outward mounting portion of the dust seal including each of the sealing layer and the debris-blocking filter layer; and
the radially outward mounting portion of the dust seal and the radially outward portion of the main seal being clamped axially between the first housing piece and the second housing piece.

2. The rotatable shaft assembly of claim 1 wherein the main seal projects from the seal housing in a first axial direction, and the dust seal projects from the seal housing in a second axial direction.

3. The rotatable shaft assembly of claim 2 wherein the first housing piece includes an outer housing piece forming an L-shape in cross-section, and the second housing piece includes an inner housing piece forming an L-shape in cross-section and mated with the outer housing piece.

4. The rotatable shaft assembly of claim 1 wherein the ventilation opening is one of a plurality of through-holes having a circumferential distribution and spaced radially outward from the radially inward dust seal lip.

5. The rotatable shaft assembly of claim 4 wherein the seal cavity includes a circumferential seal cavity that extends between the main seal, the dust seal, and the rotatable shaft, and the debris-blocking filter layer is attached to an outer surface of the sealing layer opposite to the circumferential seal cavity.

6. The rotatable shaft assembly of claim 1 further comprising a wear sleeve fitted upon the rotatable shaft, and each of the main seal and the dust seal rides in contact with the wear sleeve at the respective first axial location and second axial location.

7. The rotatable shaft assembly of claim 6 wherein the rotatable shaft includes an engine crankshaft.

8. A rotatable shaft seal assembly comprising:
a seal housing defining a center axis;
a main seal extending circumferentially around the center axis and including a mounting portion coupled to the seal housing, and a main seal lip;
a dust seal extending circumferentially around the center axis and including a mounting portion coupled to the seal housing, and a dust seal lip;
the dust seal further including a sealing layer forming the dust seal lip and having a ventilation opening formed therein, and a debris-blocking filter layer attached to the sealing layer and positioned across the ventilation opening;
the dust seal further including a dust seal outside surface exposed outside of the dust seal assembly, and a dust seal inside surface exposed to a seal cavity extending from the dust seal to the main seal;
the seal housing including a first housing piece and a second housing piece, and the mounting portion of the dust seal including each of the sealing layer and the debris-blocking filter layer; and
the mounting portion of the dust seal and the mounting portion of the main seal are radially outward, respectively, of the dust seal lip and the main seal lip, and clamped axially between the first housing piece and the second housing piece.

9. The assembly of claim 8 further comprising a wear sleeve, and wherein the main seal is curved in axial profile and positioned to ride in contact with the wear sleeve at a first axial location, and the dust seal is positioned to ride in contact with the wear sleeve at a second axial location.

10. The assembly of claim 9 wherein the seal cavity includes a circumferential seal cavity that extends between the main seal, the dust seal, and the wear sleeve, and the main seal projects from the seal housing in a first axial direction and the dust seal projects from the seal housing in a second axial direction.

11. The assembly of claim 8 wherein the ventilation opening is one of a plurality of through-holes having a circumferential distribution and spaced radially outward from the dust seal lip.

12. The assembly of claim 11 wherein the sealing layer includes an inner surface facing the main seal, and an outer surface, and the debris-blocking filter layer is attached to the outer surface.

13. The assembly of claim 12 wherein the debris-blocking filter layer is continuous in extent circumferentially around the center axis.

14. The assembly of claim 8 wherein the seal housing is formed of a metallic material, each of the main seal and the sealing layer is formed of a polymeric material, and the debris-blocking filter layer is formed of a textile material.

15. The assembly of claim 8 wherein the first housing piece includes an outer housing piece and the second housing piece includes an inner housing piece, and the mounting portion of the main seal and the mounting portion of the dust seal extend between the outer housing piece and the inner housing piece.

16. The assembly of claim 14 wherein the sealing layer is sandwiched within the seal housing between the debris-blocking filter layer and the main seal.

17. The assembly of claim 15 wherein:
each of the outer housing piece and the inner housing piece forms an L-shape and includes a cylindrical outer surface, a cylindrical inner surface, an inside axial surface, and an outside axial surface;
the cylindrical inner surface of the outer housing piece is interference-fitted with the cylindrical outer surface of the inner housing piece; and
the main seal and the dust seal are clamped between the inside axial surface of the outer housing piece and the outside axial surface of the inner housing piece.

18. A seal assembly comprising:
a seal housing defining a center axis;
a main seal extending circumferentially around the center axis and including a mounting portion coupled to the seal housing, and a main seal lip radially inward of the respective mounting portion;
a dust seal extending circumferentially around the center axis and including a mounting portion coupled to the seal housing, a dust seal lip radially inward of the respective mounting portion, an inner surface, and an outer surface;
an outer housing piece forming a first L-shape in cross section;
an inner housing piece mated with the outer housing piece and forming a second L-shape in cross section that is arranged parallel to the first L-shape, and the mounting portion of the main seal and the mounting portion of the dust seal are sandwiched axially between the outer housing piece and the inner housing piece; and
the dust seal further having formed therein a ventilation opening communicating between the inner surface and the outer surface, and including a debris-blocking filter positioned across the ventilation opening.

19. The seal assembly of claim 18 wherein the ventilation opening is one of a plurality of through-holes having a circumferential distribution and spaced radially outward of the dust seal lip.

20. The seal assembly of claim 19 wherein the dust seal further includes a sealing layer forming the inner surface and the outer surface, and the debris-blocking filter includes a felt filter layer attached to one of the inner surface or the outer surface.

* * * * *